R. W. RULIFFSON.
AGRICULTURAL STEAMER.

No. 183,331.  Patented Oct. 17, 1876.

WITNESSES:
A. W. Almqvist
John Goethals

INVENTOR:
R. W. Ruliffson
BY
ATTORNEYS.

UNITED STATES PATENT OFFICE.

RULIFF W. RULIFFSON, OF STAMFORD, NEW YORK.

IMPROVEMENT IN AGRICULTURAL STEAMERS.

Specification forming part of Letters Patent No. 183,331, dated October 17, 1876; application filed September 22, 1876.

*To all whom it may concern:*

Figure 1:
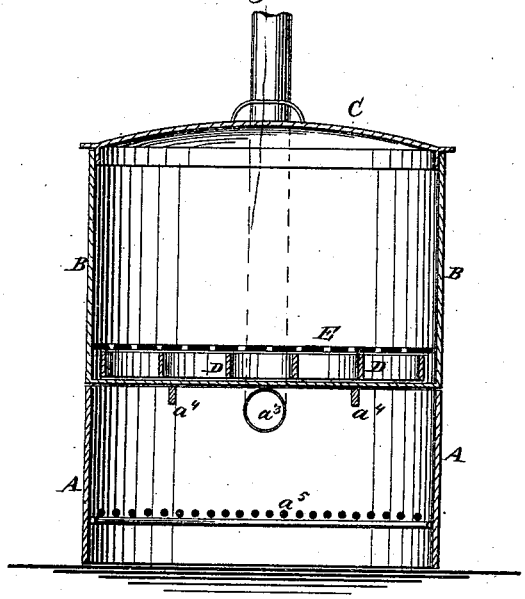
Figure 2:
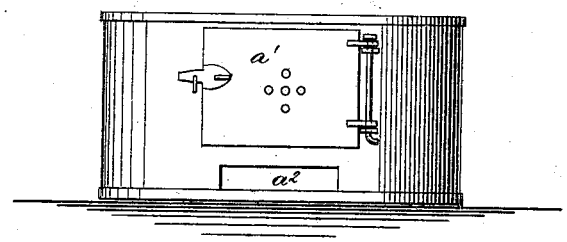

Be it known that I, RULIFF W. RULIFFSON, of Stamford, in the county of Delaware and State of New York, have invented a new and useful Improvement in Steaming Apparatus for Cooking Food for Stock, of which the following is a specification:

Figure 1 is a vertical section of my improved apparatus. Fig. 2 is a detail front view of the fire-chamber.

Similar letters of reference indicate corresponding parts.

The object of this invention is to furnish an improved apparatus for cooking food for stock and other purposes, which shall be simple in construction, inexpensive in manufacture, and will enable the cooking to be done with a comparatively small amount of fuel.

The invention consists in the fire-box, made of sheet-iron, open at top and bottom, provided with a door, a draft-opening, a pipe-collar, and one or more cross-bars, whether a grate be used or not, and in an improved steaming apparatus formed of the sheet-iron fire-box, provided with the door, draft-opening, pipe-collar, and cross-bars, and the cooking-vessel also made of sheet-iron, and provided with a cover, a rack, and a perforated false bottom, as hereinafter fully described.

A represents the fire-box, which is made of sheet-iron, and may be round, oval, square, or of other desired form, and may be of any desired size. The fire-box A is provided with a door, $a^1$, a draft-opening, $a^2$, and a collar, $a^3$, to receive a pipe to carry off the smoke and cause a draft. To the top of the box A are attached one or more cross-bars, $a^4$, the number depending upon the size of the box, to assist in supporting the cooking-vessel B. The box A is made open at the top and bottom, and is designed to be set upon the ground or upon a stone or brick foundation, and may be provided with a grate, $a^5$, to support the fire or not, as may be desired. The vessel B is also made of sheet-iron, and of the same size and shape as the fire-box A, and may be of any desired depth. The vessel B is made with a flat bottom to rest and fit upon the upper edge of the fire-box A and upon the cross-bars $a^4$, so that the greatest possible amount of the heat from the fuel may be utilized. The vessel B is provided with a closely-fitting cover, C, to confine the steam. Upon the bottom of the vessel B is placed a rack, D, to support the false bottom E, which is perforated with numerous holes to allow the steam to pass through. The rack D and perforated false bottom E support the grain or vegetables above the water, and prevent any possibility of their burning upon the bottom of the vessel. The rack D and perforated false bottom E allow any dirt that may be upon the vegetables to pass through and settle upon the bottom of the vessel B, which allows the vegetables, when cooked, to be removed without disturbing the dirt.

The vessel B may be raised from the fire-box with a derrick, and its contents discharged at once into a receiver.

Having thus described my invention, I claim as new and desire to secure by Letters Patent—

1. The fire-box A, made of sheet-iron, open at top and bottom, provided with a door, $a^1$, a draft-opening, $a^2$, a pipe-collar, $a^3$, and one or more cross-bars, $a^4$, whether a grate, $a^5$, be used or not, substantially as herein shown and described.

2. An improved steaming apparatus formed of the sheet-iron fire-box A, provided with the door $a^1$, draft-opening $a^2$, pipe-collar $a^3$, and cross-bars $a^4$, and the vessel B, also made of sheet-iron, and provided with a cover, C, a rack, D, and a perforated false bottom, E, substantially as herein shown and described.

RULIFF W. RULIFFSON.

Witnesses:
JAMES T. GRAHAM,
C. SEDGWICK.